3,088,802
PRODUCTION OF TETRACHLOROPALLADATES
Francis Sidney Clements, Hunts Hill, and Eric Victor
Nutt, Acton, London, England, assignors to The International Nickel Company, Inc., New York, N.Y., a
corporation of Delaware
No Drawing. Filed June 3, 1960, Ser. No. 33,628
Claims priority, application Great Britain June 19, 1959
2 Claims. (Cl. 23—51)

The present invention relates to the preparation of complex halide compounds of precious metals and, more particularly, to the production of tetrachloropalladates, i.e., salts of the acid radical $[PdCl_4]^=$, from metallic palladium.

Hitherto, the usual method for the production of sodium tetrachloropalladate from metallic palladium has been to convert the palladium to hydrogen tetrachloropalladate $H_2[PdCl_4]$ and to evaporate this with a solution of sodium chloride. This is a tedious operation, as the palladium must first be dissolved in aqua regia and the solution repeatedly evaporated with hydrochloric acid to free it from residual compounds of nitrogen before the addition of the sodium chloride and even then the salt produced generally requires recrystallization. Although attempts were made to overcome the foregoing difficulties and other disadvantages, none, as far as we are aware, was entirely successful when carried into practice commercially on an industrial scale.

A method of making sodium and other tetrachloropalladates from metallic palladium has now been discovered which can be carried out rapidly with quite simple equipment and inexpensive reagents.

It is an object of the present invention to provide a novel method for the production of tetrachloropalladates of calcium, zinc, barium and alkali metals having an atomic number from about 3 to about 37.

Another object of the invention is to provide a novel process particularly adapted for the production of lithium and sodium tetrachloropalladates from metallic palladium.

Other objects and advantages will become apparent from the following description.

Generally speaking, the present invention contemplates the production of metal salts of tetrachloropalladic acid (i.e., metal tetrachloropalladates) by reacting metallic palladium with chlorine in the presence of an aqueous solution of a metal chloride. Initially, the solution contains at least about the amount of said metal chloride stoichiometrically needed to combine with the metallic palladium present as the metal tetrachloropalladate. The metal chloride can be sodium chloride, potassium chloride, lithium chloride, calcium chloride, rubidium chloride, barium chloride and zinc chloride. The chlorides of zinc, barium, calcium, lithium and sodium are especially advantageous since, with these chlorides, rapid rates of reaction can be achieved under normal conditions, to wit, a temperature in the liquid range of water and a pressure of at least about atmospheric. Advantageously, the temperature during the reaction is about 50° C. to about 80° C. and, more advantageously, about 63° C. to 73° C. When the pressure is of the order of about one atmosphere, the temperature advantageously does not exceed about 83° C.

The particulars with regard to process steps depend upon the control of the amount of chlorine reacted with the metallic palladium initially in association with the metal chloride solution. Assuming that X moles of metallic palladium are present in the reaction mixture and about AX moles of metal chloride (where A is 1 in the case of divalent metals such as calcium and zinc and is 2 in the case of univalent metals such as sodium and lithium) ($Me_bCl_c$, where $b$ and $c$ are either 1 or 2), when the amount of chlorine reacted with the palladium is about X moles, tetrachloropalladates will be produced directly. When an excess of chlorine is permitted to react so as to produce any substantial amount of tetravalent palladium at the end of the reaction, it is advantageous to react such tetravalent palladium with additional metallic palladium in the presence of additional $Me_bCl_c$ in order to produce the metal tetrachloropalladate in good yield based upon the chlorine employed.

According to one embodiment of the invention, metallic palladium, advantageously in the form of sponge, is first converted to a hexachloropalladate by treating it with chlorine and an aqueous solution of a chloride. Then the hexachloropalladate is converted to a tetrachloropalladate by treatment with a further quantity of metallic palladium and of aqueous chloride solution.

In the first stage at least enough chloride ion should be present in the aqueous solution, which is advantageously substantially saturated, to combine with all the palladium to form hexachloropalladate according to the equation:

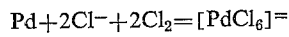
$$Pd + 2Cl^- + 2Cl_2 = [PdCl_6]^=$$

In other words, for each mole of palladium present in the initial mixture, 2 moles of chloride ion should also be present. The further quantity of metallic palladium required in the second stage is equal to that already in solution as $[PdCl_6]^=$, the reaction in the second stage being represented by the equation:

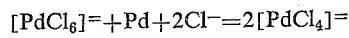
$$[PdCl_6]^= + Pd + 2Cl^- = 2[PdCl_4]^=$$

If desired, the whole of the chloride ion required for both stages of the reaction can be present initially. If this is not the case, a further quantity must be added after the first stage. As mentioned hereinbefore, by controlling the amount of chlorine reacted, the use of additional metallic palladium can be avoided and thus all of the metallic palladium and chloride ion can advantageously be present initially. An excess of chloride should not be present in the second stage, as the tetrachloropalladates are generally very soluble and separation from excess chloride ion is very difficult.

Both steps in the process can be carried out without external heating since heat is evolved as the palladium is dissolved, but a short period of boiling may be advantageous at the end of the second stage to complete the reduction of residual hexachloropalladates. The pH of the solution obtained is generally slightly greater than 3.

The initial rate of reaction when chlorine is passed through an aqueous chloride solution in contact with metallic palladium is slow, even with vigorous agitation. It is not substantially increased by heating the reagents, but gradually increases as palladium goes into solution. It is found that this increased rate of reaction is due to the presence of tetrachloropalladate or hexachloropalladate $[PdCl_6]^=$ in solution and we, therefore, prefer to add a small amount of one of these salts initially to the aqueous chloride solution. It is believed the explanation of these phenomena to be that in the absence of added soluble chloropalladates, the attack on the palladium proceeds by the slow reaction:

$$Pd + 2Cl^- + Cl_2 \rightarrow [PdCl_4]^= \qquad (1)$$

The tetrachloropalladate initially formed is at once oxidized to hexachloropalladate by the rapid reaction:

$$[PdCl_4]^= + Cl_2 \rightarrow [PdCl_6]^= \qquad (2)$$

The solution containing hexachloropalladate then dissolves further palladium by the rapid reaction:

$$[PdCl_6]^= + 2Cl^- + Pd \rightarrow 2[PdCl_4]^= \qquad (3)$$

to form tetrachloropalladate, which is further oxidized to hexachloropalladate by Reaction 2.

The initial addition of a small amount of either $[PdCl_4]^=$ or $[PdCl_6]^=$ thus enables attack on the palladium to take place according to Equation 3 immediately, whereas otherwise the rate of solution is slow until a sufficient concentration of these ions has been built up in the solution.

Owing to the favorable effect of dissolved hexachloropalladate on the solution of palladium by chlorine, the process according to the invention is most suitable for use with metals having soluble hexachloropalladates. If the hexachloropalladate is only slightly soluble it will be precipitated from the chloride solution during the first stage and the rate of solution of the palladium will remain fairly slow. The separated hexachloropalladate may, however, be redissolved in the second stage on shaking with further chloride solution and metallic palladium.

For the purpose of giving those skilled in the art a better understanding of the invention and/or a better appreciation of the advantages of the invention, the following illustrative examples are given:

*Example I*

This example illustrates the production of sodium tetrachloropalladate.

100 parts by weight of commercial palladium sponge was immersed in about 650 parts by weight of water containing 219 parts by weight of sodium chloride (this amount of sodium chloride is equivalent to 200 parts by weight of palladium) in a vessel fitted with a mechanical stirrer and chlorine was passed through the liquid until absorption of the gas ceased. Absorption of chlorine was slow at first, but gradually became faster, and the whole reaction took 3½ hours, during which time the temperature rose from 17° C. to a maximum of 50° C. The whole of the palladium went into solution and some crystals separated from the liquor. These were identified as a hydrate of the unstable sodium hexachloropalladate $Na_2[PdCl_6]XH_2O$ which on drying at 105° C. yielded sodium tetrachloropalladate with evolution of chlorine.

A further 100 parts by weight of palladium sponge was then added to the mixture of liquor and crystals and stirring was recommenced. The liquor became warm once again. On cooling, no crystals separated out and on filtration only 2.6 parts by weight of palladium was found to be undissolved. The liquor smelt slightly of chlorine and on testing with potassium chloride it was found to contain a small amount of hexachloropalladate. This was decomposed to tetrachloropalladate by boiling the liquor for a short time, after which neither free chlorine nor hexachloropalladate could be detected. The solution had a pH of 3.5.

*Example II*

A nearly saturated aqueous solution of sodium chloride was prepared, containing 223 parts by weight of sodium chloride in about 650 parts by weight of water. 10 parts by weight of sodium tetrachloropalladate was dissolved in the liquor, 100 parts by weight of palladium was added and chlorine was bubbled through the mixture with stirring. Reaction began at once and little more chlorine was being absorbed after 1½ hours.

An amount of palladium equal to that already in the system (103.6 parts by weight) was then added and stirring was continued for two hours. The temperature rose to a maximum ten minutes after the palladium addition. After two hours, a small amount of undissolved palladium was still present and the liquor still smelt of chlorine. The solution was heated to boiling and maintained in that state for ¾ hour. The boiling point was about 107° C. Filtration of the resulting solution removed 0.47 part by weight undissolved palladium, leaving a solution of sodium tetrachloropalladate containing 242 grams of palladium per liter together with a slight excess of sodium chloride. This solution is a suitable starting material for the manufacture of catalysts.

Evaporation of a portion of this liquor to half volume and cooling produced a saturated solution and crystals of the tetrahydrate of sodium tetrachloropalladate. At 20° C., the saturated solution contained approximately 385 grams per liter of palladium, equivalent to approximately 1060 grams of $Na_2[PdCl_4]$ per liter. In view of this extremely high solubility and of the difficulty of drying the tetrahydrate, which liquifies in its water of crystallization on heating, it appears that the only possible way of recovering the solid salt is to remove the water by evaporation to dryness.

More concentrated solutions of sodium tetrachloropalladate can be obtained by using initially only sufficient sodium chloride to form sodium hexachloropalladate and then adding additional sodium chloride in the solid state with further addition of palladium. This is illustrated by the following example.

*Example III*

50 parts by weight of palladium, 2.5 parts by weight of sodium tetrachloropalladate and 56 parts by weight of sodium chloride were fully chlorinated in about 245 parts by weight of water. A further 51 parts by weight of palladium and 56 parts by weight of solid sodium chloride were then added and the solution was stirred and finally boiled until free from chlorine. 0.70 part by weight of palladium remained undissolved and were recovered by filtration, leaving a solution containing 330 grams palladium per liter. The sodium chloride content of this solution was somewhat higher than that obtained in Example II.

Similar results to those using sodium chloride solutions were obtained using solutions of lithium, calcium, barium and zinc chlorides. The hexachloropalladates of all these metals are soluble in water. When solutions of potassium and rubidium chlorides were used, however, initial attack on the palladium was followed by precipitation of insoluble hexachloropalladates and the rate of solution of the palladium remained slow. On separating the potassium hexachloropalladate and shaking it with further palladium in an aqueous solution of potassium chloride it dissolved as the more soluble tetrachloropalladate. It is to be noted that in each of the foregoing examples at least one mole equivalent of chlorine was absorbed by the solution and reacted with the palladium. Advantageously, no more than about two mole equivalents of chlorine are employed since this is the amount of chlorine stoichiometrically necessary to produce the hexachloropalladate ion.

*Example IV*

As an illustration of industrial scale production of sodium tetrachloropalladate, 55 kilograms (kgs.) of sodium chloride were dissolved in 160 liters of water. To this solution was added 50.635 kgs. of sponge palladium and 9.195 kgs. of palladium as $Na_2PdCl_4$ solution. 37.4 kgs. of chlorine were absorbed by the mixture over a period of 7¾ hours while the temperature of the system was maintained under a maximum of about 74° C. After the chlorine treatment was discontinued, the solution was boiled for two hours. On cooling the pH was 3.4. The solution was then filtered during which no insoluble palladium was found. Overall 59.414 kgs. of palladium was recovered as sodium tetrachloropalladate.

The present invention is particularly applicable to the production of tetrachloropalladates of lithium, sodium, calcium, zinc and barium which can thereafter be employed as electrolysis salts and for the manufacture of catalysts.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

This method is more suitable for the production of tetrachloropalladates than methods based upon the initial use of hydrochloric acid since the desired product is obtained by chlorination and boiling only, neutralization or evaporation to dispose of the acid is avoided, and the reagents are less costly.

We claim:

1. A process for the production of a tetrachloropalladate salt of a metal selected from the group consisting of sodium, lithium, calcium, barium and zinc comprising reacting metallic palladium with at least one mole equivalent weight of gaseous chlorine and up to about two mole equivalent weights of gaseous chlorine in the presence of an aqueous solution of a chloride of a metal of said group while maintaining the temperature within the liquid range of water and not in excess of about 83° C and while maintaining the pressure at at least about one atmosphere to dissolve said metallic palladium and produce a palladium-containing solution, adding to the palladium-containing solution so produced an amount of metallic palladium substantially equal to that amount of palladium present in solution as the hexachloropalladate ion, allowing the reaction of the metallic palladium with the solution components to proceed to substantial completion to dissolve substantially all of the added metallic palladium and, thereafter, decomposing by heating any residual hexachloropalladate ion to form an aqueous solution of tetrachloropalladate ion having a pH value greater than about 3.

2. A process as set forth and defined in claim 1, wherein the tetrachloropalladate is sodium tetrachloropalladate and the metal chloride is sodium chloride.

References Cited in the file of this patent

UNITED STATES PATENTS 2,150,366   Ehrhart _____ Mar. 14, 1939

OTHER REFERENCES

Mellor: Comprehensive Treatise on Inorganic and Theoretical Chemistry, Longmans, Green and Co., N.Y., 1936, vol. 15, pages 660 to 673 (pages 671 to 673 particularly relied on).